(12) United States Patent
Xiao et al.

(10) Patent No.: US 12,412,956 B2
(45) Date of Patent: Sep. 9, 2025

(54) BATTERY SEPARATORS, COATED BATTERY SEPARATORS, BATTERIES, AND RELATED METHODS

(71) Applicant: CELGARD, LLC, Charlotte, NC (US)

(72) Inventors: Kang Karen Xiao, Mississauga (CA); Allen M. Donn, Rock Hill, SC (US); Stefan Reinartz, Waxhaw, NC (US); Changqing Wang Adams, Fort Mill, SC (US); Masaaki Okada, Charlotte, NC (US); Brian R. Stepp, Scottsdale, AZ (US); Eric Robert White, Fort Mill, SC (US); Katharine Chemelewski, Campbell, CA (US)

(73) Assignee: Celgard, LLC, Charlotte, NC (US)

( * ) Notice: Subject to any disclaimer, the term of this patent is extended or adjusted under 35 U.S.C. 154(b) by 1339 days.

(21) Appl. No.: 17/054,196

(22) PCT Filed: May 10, 2019

(86) PCT No.: PCT/US2019/031690
§ 371 (c)(1),
(2) Date: Nov. 10, 2020

(87) PCT Pub. No.: WO2019/217797
PCT Pub. Date: Nov. 14, 2019

(65) Prior Publication Data
US 2021/0257701 A1 Aug. 19, 2021

Related U.S. Application Data

(60) Provisional application No. 62/670,048, filed on May 11, 2018, provisional application No. 62/669,531, filed on May 10, 2018.

(51) Int. Cl.
H01M 50/417 (2021.01)
H01M 10/0525 (2010.01)
(Continued)

(52) U.S. Cl.
CPC ..... H01M 50/417 (2021.01); H01M 10/0525 (2013.01); H01M 50/423 (2021.01);
(Continued)

(58) Field of Classification Search
CPC .......................... H01M 50/417; H01M 50/449
See application file for complete search history.

(56) References Cited

U.S. PATENT DOCUMENTS

| | | | | |
|---|---|---|---|---|
| 2003/0031924 A1* | 2/2003 | Lee | ...................... | H01M 50/417 |
| | | | | 429/142 |
| 2008/0118827 A1* | 5/2008 | Call | ..................... | H01M 50/489 |
| | | | | 429/129 |
| 2011/0318630 A1* | 12/2011 | Wakizaka | ........... | H01M 50/489 |
| | | | | 429/144 |

OTHER PUBLICATIONS

Saffar, Amir, et al. "Development of polypropylene microporous hydrophilic membranes by blending with PP-g-MA and PP-g-AA." Journal of Membrane Science 462 (2014): 50-61. (Year: 2014).*

* cited by examiner

*Primary Examiner* — Allison Bourke
*Assistant Examiner* — Kayla Elaine Clary
(74) *Attorney, Agent, or Firm* — J. Clinton Wimbish; Maynard Nexsen PC

(57) ABSTRACT

A new or improved microporous monolayer, bilayer, trilayer, or multilayer membrane, separator membrane, separator, or coated separator is disclosed. The membrane is preferably made up of at least one resin or polymer and at least one additive. The additive may comprise at least one material that improves adhesion of the microporous membrane to a coating, including a polyaramid-containing coating and a PCS coating, or to a different material such as a metallic surface, including an electrode surface. Improvements in adhesion are based on comparisons to similar microporous membranes without the at least one additive. In some preferred embodiments, the at least one additive may
(Continued)

SEM Images at 20,000x (sides A and B) for Example 4

A

B comprise, consist of, or consist essentially of a functionalized polymer or the combination of a functionalized polymer and an elastomer. In some embodiments, the functional group of the functionalized polymer may be maleic anhydride (MAH). Also disclosed is a battery separator or coated separator comprising the new or improved microporous membrane. The battery separator may comprise the microporous membrane coated with a polyaramid-containing coating. Also disclosed is a new or improved separator, composite, battery, secondary lithium ion battery, and/or vehicle or device comprising the separator, composite, or battery.

30 Claims, 11 Drawing Sheets

(51) Int. Cl.
    *H01M 50/423*    (2021.01)
    *H01M 50/449*    (2021.01)
    *H01M 50/46*     (2021.01)
    *H01M 50/491*    (2021.01)
(52) U.S. Cl.
    CPC ......... *H01M 50/449* (2021.01); *H01M 50/46* (2021.01); *H01M 50/491* (2021.01)

| TABLE 1 | | | Comparative Example 1(a) and 1(b) | Example 1 | Example 2(a) and 2(b) | | Example 3 |
|---|---|---|---|---|---|---|---|
| Actual blend | | | PP+ no additive | PP+5% maleic anhydride modified HDPE | PP+ 10% maleic anhydride modified Homo-PP | | PP+ 10% maleic anhydride modified Co-PP |
| MA Additive % | | | 0 | 5 | 10 | | 10 |
| Ply # | | | 2 | 2 | 2 | 2 | 2 |
| Thickness, mil | | AVG | 0.623 | 0.631 | 0.631 | | 0.616 |
| | | RANGE | 0.113 | 0.115 | 0.134 | | 0.091 |
| R&D | Gurley, s | | 197 | 215 | 220 | 215 | 207 | 353 |
| | Gurley STDEV, s | | 9 | 14 | | 13 | 9 | 51 |
| | Ply-to-ply Adhesion | | good | good | good | sticky but peelable | best; sticky but peelable | sticky but peelable |
| QC | Thick, um | | 13 | 13.65 | 13.6 | 14.07 | 14.19 | 13.14 |
| | BW, mg/cm2 | | 0.62 | 0.651 | 0.6407 | 0.6975 | 0.6665 | 0.6562 |
| | PS., gf | | 240 | 278 | 251 | 246 | 242 | 222 |
| | PS/BW, gf/(mg/cm2) | | 387.1 | 427.0 | 391.8 | 352.7 | 363.1 | 338.3 |
| | PS/Thick, gf/um | | 18.5 | 20.4 | 18.5 | 17.5 | 17.1 | 16.9 |
| | ER, ohm-cm2 | | 0.62 | 0.64 | 0.93 | 0.9 | 0.99 | 1.49 |
| | 105C1hr MD shrinkage, % | | 24.12 | 25.6 | 10.15 | 10 | 23.06 | 18.26 |
| | Tensile MD | Strength, kgf/cm2 | 1571 | 1413 | 1456 | 1295 | 1264 | 1512 |
| | | Elongation, % | 55 | 41 | 57 | 73 | 56 | 62 |
| | Tensile TD | Strength, kgf/cm2 | 170 | 165 | 166 | 138 | 143 | 162 |
| | | Elong, % | 687 | 679 | 699 | 438 | 408 | 586 |

Fig. 1

TABLE 2

| | Actual Blend | | Comparative Example 1(a) | Example 2(b) | Example 3 | Example 4 |
|---|---|---|---|---|---|---|
| | | | PP with no additive | PP+ 10% maleic anhydride modified Homo-PP | PP+10% maleic anhydride modified Co-PP | PP+15% maleic anhydride modified Homo-PP |
| R&D | Gurley, s | | 197 | 207 | 353 | 174 |
| | Ply-to-ply Adhesion | | good | best; sticky but peelable | sticky but peelable | sticky but peelable |
| QC | Thick, um | | 13 | 14.19 | 13.14 | 13.9 |
| | BW, mg/cm2 | | 0.62 | 0.6665 | 0.6562 | 0.6613 |
| | PS., gf | | 240 | 242 | 222 | 223 |
| | PS/BW, gf/(mg/cm2) | | 387.1 | 363.1 | 338.3 | 337.2 |
| | PS/Thick, gf/um | | 18.5 | 17.1 | 16.9 | 16.0 |
| | ER, ohm-cm2 | | 0.62 | 0.99 | 1.49 | 0.65 |
| | 105C1hr MD shrinkage, % | | 24.12 | 23.06 | 18.26 | 11.3 |
| | Tensile MD | Strength, kgf/cm2 | 1571 | 1264 | 1512 | 1311 |
| | | Elong, % | 55 | 56 | 62 | 45 |
| | Tensile TD | Strength, kgf/cm2 | 170 | 143 | 162 | 132 |
| | | Elong, % | 687 | 408 | 586 | 340 |
| SAL | AP Pore size, um | | 0.0381 | 0.0403 | 0.0376 | 0.0476 |
| | Porosity by AP, % | | 46.35 | 44.98 | 39.42 | 44.75 |
| | Mix-P, Kgf | | 649 | 706 | 718 | 706 |
| | Mix-P/thick, kgf/um | | 50 | 50 | 55 | 51 |
| | DB Avg, V | | 1650 | 1773 | 1878 | 1632 |
| | DB STDEV, V | | 212 | 194 | 221 | 149 |
| | DB min, V | | 1010 | 1150 | 1140 | 1250 |
| | C V (electrochemical activity) | | | | | |

Fig. 2

| TABLE 3 | | | Comparative Example 1(c) and 1(d) | Comparative Examples 1(a) and 1(b) | | Examples 2(a) and 2(b) | Example 5 | Example 6 | Example 7 |
|---|---|---|---|---|---|---|---|---|---|
| Actual blend | | | PP with no additives | PP with no additives | | PP+10% maleic anhydride modified Homo-PP | PP+ 5% styrene-ethylene-propylene-styrene copolymer | PP+10% maleic anhydride modified homo-PP and 5% styrene-ethylene-propylene-styrene copolymer | PP+10% maleic anhydride modified homo-PP+5% propylene-ethylene elastomer |
| R&D | Gurley, s | | 197 | 203 | 197 | 215 | 215 | 207 | 300 | 237 | 184 |
| | Ply-to-ply Adhesion | | good | good | good | good | sticky but peelable | best; sticky but peelable | sticky but peelable | sticky but peelable | sticky but peelable |
| QC | Thick, um | | 13 | 13.9 | 13 | 13.65 | 14.07 | 14.19 | 11.83 | 12.85 | 13.8 |
| | BW, mg/cm2 | | 0.64 | 0.67 | 0.62 | 0.651 | 0.6975 | 0.6665 | 0.6706 | 0.6976 | 0.662 |
| | PS., gf | | 241 | 241 | 240 | 278 | 246 | 242 | 267 | 275 | 195 |
| | PS/BW, gf/(mg/cm2) | | 377 | 360 | 387.1 | 427.0 | 352.7 | 363.1 | 398.2 | 394.2 | 294.6 |
| | PS/Thick, gf/um | | 18.5 | 17.3 | 18.5 | 20.4 | 17.5 | 17.1 | 22.6 | 21.4 | 14.1 |
| | ER, ohm-cm2 | | 0.8 | 0.84 | 0.62 | 0.64 | 0.9 | 0.99 | 1.63 | 1.05 | 0.8 |
| | 105C1hr MD shrinkage, % | | 14.2 | 15.8 | 24.12 | 25.6 | 10 | 23.06 | 7.8 | 8.4 | 13.3 |
| | Tensile | MD | Strength, kgf/cm2 | 1589 | 1544 | 1571 | 1413 | 1295 | 1264 | 1821 | 1574 | 1335 |
| | | | Elong, % | 47 | 42 | 55 | 41 | 73 | 56 | 48 | 50 | 44 |
| | | TD | Strength, kgf/cm2 | 167 | 144 | 170 | 165 | 138 | 143 | 141 | 128 | 146 |
| | | | Elong, % | 645 | 633 | 687 | 679 | 438 | 408 | 488 | 399 | 596 |
| | AP Pore size, um | | 0.043 | 0.039 | 0.0381 | | | 0.0403 | 0.0476 | 0.0488 | 0.0468 |
| | Porosity by AP, % | | 45.7 | 44.2 | 46.35 | | | 44.98 | 40.13 | 40.44 | 44.65 |
| SAL | Mix-P, Kgf | | Not tested | Not tested | 649 | | | 706 | 679 | 670 | 651 |
| | Mix-P/thick, kgf/um | | Not tested | Not tested | 50 | | | 50 | 57 | 52 | 47 |
| | DB Avg, V | | 1.47 | 1.74 | 1650 | | | 1773 | 1772 | 1781 | 1734 |
| | DB STDEV, V | | n/a | n/a | 212 | | | 194 | 107 | 97 | 144 |
| | DB min, V | | n/a | n/a | 1010 | | | 1150 | 1470 | 1530 | 1240 |
| | C-V (electrochemical activity) | | | | | | No interfering electrochemical activity | | | | |

Fig. 3

TABLE 4

| | | | PP+5% maleic anhydride modified Homo-PP | PP+10% maleic anhydride modified Homo-PP | PP+15% maleic anhydride modified Homo-PP | PP+20% maleic anhydride modified Homo-PP | PP+25% maleic anhydride modified Homo-PP |
|---|---|---|---|---|---|---|---|
| | | | Dry blend | Dry blend | | | |
| | | | 5 | 10 | 10 | 15 | 20 | 25 |
| | | | 0 | 0 | 0 | 0 | 0 |
| | | | 2 | 2 | 2 | 2 | n/a |
| | | AVG | 0.623 | 0.631 | 0.6 | 0.601 | 0.634 |
| | | RANGE | 0.124 | 0.134 | | 0.161 | 0.106 |
| Gurley, s | | | | 215 | 207 | 174 | 218 | |
| Gurley STDEV, s | | | | 13 | 9 | 4 | 18 | |
| Ply-to-ply Adhesion | | | | sticky but peelable | best; sticky but peelable | sticky but peelable | sticky but peelable-borderline | |
| Thick, um | | | | 14.07 | 14.19 | 13.9 | 13.1 | |
| BW, mg/cm2 | | | | 0.6975 | 0.6665 | 0.6813 | 0.6996 | |
| PS, gf | | | | 246 | 242 | 223 | 201 | |
| PS-%strain@max load | | | | | | 5.5 | | |
| PS/BW, gf/(mg/cm2) | | | | 352.7 | 363.1 | 337.2 | 287.3 | |
| PS/Thick, gf/um | | | | 17.5 | 17.1 | 16.0 | 15.3 | |
| ER, ohm-cm2 | | | | 0.9 | 0.99 | 0.65 | 1.2 | |
| 90C1hr MD shrinkage, % | | | | | | 6.2 | 5 | |
| 105C1hr MD shrinkage, % | | | | 10 | 23.06 | 11.3 | 9.4 | |
| 120C1hr MD shrinkage, % | | | | | | 23.1 | 30 | |
| Tensile | MD | Strength, kgf/cm2 | | 1295 | 1264 | 1311 | 1419 | |
| | | Elong, % | | 73 | 56 | 45 | 70 | |
| | TD | Strength, kgf/cm2 | | 138 | 143 | 132 | 138 | |
| | | Elong, % | | 438 | 408 | 340 | 162 | |
| AP Pore size, um | | | | | 0.0403 | 0.0476 | 0.0465 | |
| Porosity by AP, % | | | | | 44.58 | 44.75 | 42 | |
| Mix-P, kgf | | | | | 706 | 706 | 716 | |
| Mix-P/thick, kgf/um | | | | | 50 | 51 | 55 | |
| DB Avg, V | | | | | 1773 | 1632 | 1575 | |
| DB STDEV, V | | | | | 194 | 149 | 195 | |
| DB min, V | | | | | 1150 | 1250 | 910 | |
| C V (electrochemical activity) | | | | | No interfering electrochemical activity detected | | | |
| SEM image | | | | | Done; slightly thicker lamella | Thicker lamella | done | |

Fig. 4

TABLE 5: Contact Angle Results

| Fluid: | Description | Contact Angle | Age (days) |
|---|---|---|---|
| Propylene Carbonate | Example 1a (Homo-PP with no additive) | 66.57 | 13 |
| Propylene Carbonate | Example 1a (Homo-PP with no additive) | 68.85 | 139 |
| Propylene Carbonate | Example 1a (Homo-PP with no additive) | 67.02 | 318 |
| Propylene Carbonate | Example 8 (PP + 20% MAH modified Homo-PP) | 56.26 | 25 |
| Propylene Carbonate | Example 8 (PP + 20% MAH modified Homo-PP) | 68.87 | 132 |
| Propylene Carbonate | Example 30 (PP + 5% Ionomer) | 54.55 | 15 |
| Propylene Carbonate | Example 30 (PP + 5% Ionomer) | 60.98 | 67 |
| Propylene Carbonate | Example 30 (PP + 5% Ionomer) | 62.70 | 85 |

Fig. 5

SEM Image at 5,000x for Comparative Example 1(a)

SEM Image at 5,000X for Example 2(a)

BATTERY SEPARATORS, COATED BATTERY SEPARATORS, BATTERIES, AND RELATED METHODS

CROSS-REFERENCE TO RELATED APPLICATIONS

This Application Is A 371 U.S. application which claims priority to PCT/US2019/031690, filed May 10, 2019, which claims priority to U.S. Provisional Application No. 62/669,531, filed May 10, 2018, and U.S. Provisional Application No. 62/670,048, filed May 11, 2018, hereby fully incorporated by reference herein.

FIELD

A new or improved microporous monolayer, bilayer, trilayer, or multilayer membrane, separator membrane, separator, or coated separator is disclosed. The membrane is preferably made up of at least one resin or polymer and at least one additive. The additive may comprise at least one material that improves adhesion of the microporous membrane to a coating, preferably a polyaramid-containing coating, or to a different material such as a metallic surface. Improvements in adhesion are based on comparisons to similar microporous membranes without the at least one additive. In some preferred embodiments, the at least one additive may comprise, consist of, or consist essentially of a functionalized polymer or the combination of a functionalized polymer and an elastomer. In some embodiments, the functional group of the functionalized polymer may be maleic anhydride (MAH). Also disclosed is a battery separator or coated separator comprising the new or improved microporous membrane. The battery separator may comprise the microporous membrane coated with a polyaramid-containing coating. Also disclosed is a new or improved separator, composite, battery, secondary lithium ion battery, and/or vehicle or device comprising the separator, composite, or battery.

BACKGROUND

Battery separators may be formed by a dry manufacturing process, including the Celgard® dry-stretch process. Some dry battery separators may be either of a monolayer polypropylene (PP), a trilayer film consisting of PP/PE/PP, or a multilayer film, e.g., (PP)(PP)(PP)/(PE)(PE)(PE)/(PP)(PP)(PP) as described in, for example, International Patent Application No. PCT/US17/61277. Other multilayer structures are disclosed in International Patent Application No. PCT/US17/61277, which is incorporated by reference herein in its entirety. PP is typically used as a material of the outermost layer of the battery separator due to its oxidation resistance, which provides for, among other things, excellent cycling performance. In the trilayer and multilayer structures, PE can be used in the inner layer(s) to provide, among other things, high-speed shutdown capability.

A majority of high energy lithium battery separators today are coated with a ceramic coating, which may comprise organic or inorganic particles and a binder, which is commonly a polymeric binder. Ceramic coatings for battery separators were originally disclosed in U.S. Pat. No. 6,432,586, which is incorporated by reference herein in its entirety.

It is known that polyaramid material, which is commonly used as the binder in ceramic coatings and other types of coatings may not bond well with certain polyolefins (PO), such as polypropylene (PP), which as mentioned above, is a material commonly used in monolayer separators and in the exterior layer(s) of trilayer and multilayer battery separators. Some representative polyaramids are Kevlar®, Twaron®, New Star®, and Teijin conex. There are limited known ways to improve the adhesion of PP-containing layers with coatings comprising polyaramid materials, but these limited known ways require an additional processing step. For example an additional surface treatment step may be performed before coating.

Thus, a simpler or better way to improve adhesion of coatings, including those comprising polyaramid materials, to PP-containing separator or membrane layers are desired.

SUMMARY

In accordance with at least selected embodiments, the present disclosure or invention may address the prior issues, needs or problems, and/or may provide a new or improved microporous monolayer, bilayer, trilayer, or multilayer membrane, separator membrane, separator, coated separator is disclosed. The membrane is preferably made up of at least one resin or polymer and at least one additive. The additive may comprise at least one material that improves adhesion of the microporous membrane to a coating, including a polyaramid-containing coating, an aramid coating, another polymer coating, or to a different material such as a metallic surface. Improvements in adhesion are based on comparisons to similar microporous membranes without the at least one additive. In some preferred embodiments, the at least one additive may comprise, consist of, or consist essentially of a functionalized polymer or the combination of a functionalized polymer and an elastomer. In some embodiments, the functional group of the functionalized polymer may be maleic anhydride (MAH). In some embodiments, the additive may improve other properties of the microporous membrane. In these embodiments, the additive may be resins with both olefinic and polar moieties. For example, in some embodiments the additive may be at least one of acid copolymers, ionomers, and maleic-anhydride modified PP or PE homopolymer and/or copolymer resin. Also disclosed is a battery separator or coated separator comprising the new or improved microporous membrane. The battery separator may comprise the microporous membrane coated with a coating such as a polyaramid-containing coating. Also disclosed is a new or improved separator, composite, battery, secondary lithium ion battery, and/or vehicle or device comprising the separator, composite, or battery.

Any microporous membrane described herein may be used in or be a textile. For example, a textile product may comprise, consist of, or consist essentially of any microporous membrane described herein. In some embodiments, a laminate textile product comprising at least one microporous membrane described herein is described. In some embodiments, the laminate may comprise more than one microporous membrane described herein. In some embodiments, the laminate may comprise one or more microporous membranes described herein and another woven, nonwoven, knit, coating, and/or porous or microporous layer. In some embodiments, the textile or laminate textile products disclosed herein may be used in a garment such as jackets, pants, shirts, hats, socks, underwear, gloves, or shorts. In some embodiments, the textile or laminate textile products disclosed herein may be used to form outdoor gear such as tents, backpacks, or tarps.

In other embodiments, a laminate or composite membrane, material or separator may comprise one or more microporous membranes described herein and another woven, nonwoven, knit, coating, and/or porous or microporous layer.

In some other embodiments, a single membrane or separator or a laminate or composite membrane, material or separator may be embossed, calendered, coated, treated, and/or further processed depending on the desired end use, thickness, design, pattern, etc.

DESCRIPTION OF THE DRAWINGS

FIG. 1 is a table including data collected for some embodiments described herein.

FIG. 2 is a table including data collected for some embodiments described herein.

FIG. 3 is a table including data collected for some embodiments described herein.

FIG. 4 is a table including data collected for some embodiments described herein.

FIG. 5 is a table including data collected for some embodiments described herein.

DESCRIPTION

Figure 6:
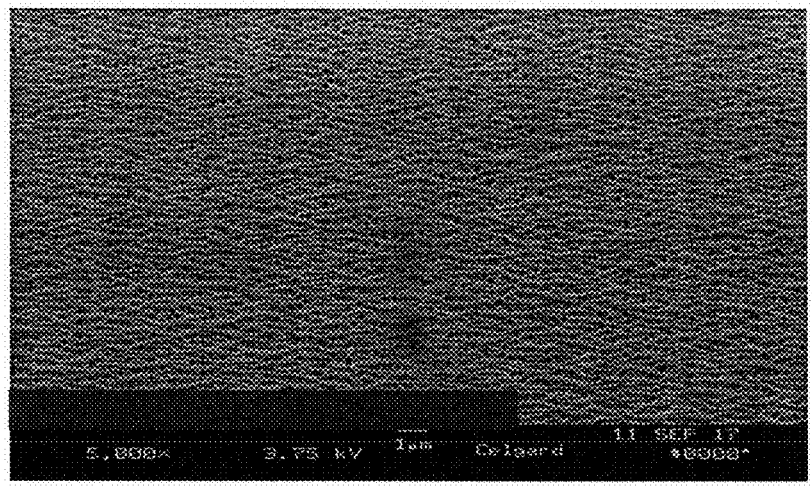
FIG. 6 is an SEM image of an embodiment described herein.

Described herein are new or improved microporous membranes, which may be used as or in battery separators for, for example, lithium ion batteries. Some microporous membranes described herein have improved adhesion to coatings, metals, and/or polyaramid-material-containing coatings compared to prior monolayer polypropylene (PP), a trilayer film consisting of PP/PE/PP, or a multilayer film (two or more layers), e.g., (PP)(PP)(PP)/(PE)(PE)(PE)/(PP)(PP)(PP) as described in, for example, International Patent Application No. PCT/US17/61277.

In one aspect, a microporous membrane made from at least one polymer or resin and at least one additive is described herein. At least one surface of the microporous membrane exhibits a higher adhesion or adhesive strength with a coating, including a coating comprising a polyaramid (or poly-aramid or aramid), or with a metallic surface than another microporous membrane that is otherwise the same, except that the other microporous membrane does not comprise the at least one additive. In some embodiments, both surfaces of the microporous membrane exhibit a higher adhesive strength with a coating, including a coating comprising a polyaramid, or with a metallic surface than another microporous membrane that is otherwise the same, except that the other microporous membrane does not comprise the at least one additive. The higher adhesion of the surface(s) of the microporous membrane comprising the at least one additive is realized even without coating, treating, or doing anything to the surface(s) of the microporous membrane to increase adhesion.

In some embodiments, the at least one polymer used in the microporous membrane is polypropylene or another polymer that is immiscible with polyaramid. Another polymer, including a polymer that is immiscible, miscible, or partially miscible with polyaramid, may be used in addition to the polypropylene or other polymer that is immiscible with polyaramid. The polypropylene may be at least one of a homopolymer polypropylene, a copolymer polypropylene, a terpolymer polypropylene, and combinations thereof.

In some embodiments, the additive is a compatibilizer for polypropylene and any polymer that is immiscible with polypropylene. For example, the compatibilizer could be used to stabilize a blend of polypropylene and any polymer that is immiscible with polypropylene. In some embodiments, the additive comprises a functionalized polymer. For example, a maleic anhydride modified polyolefin may be used. Exemplary functionalized polyolefins may be selected from the group consisting of maleic anhydride modified polyethylene, maleic anhydride polypropylene, and combinations thereof. Specific examples of maleic anhydride modified polyolefins include maleic anhydride modified high-density polyethylene (MA-HDPE), maleic anhydride modified copolymer polypropylene (MA-Co-PP), and maleic anhydride modified homopolymer polypropylene (MA-Homo-PP).

In some embodiments, the additive may be present in an amount of 0.05 to 20 wt. %, 0.5 to 15 wt. %, 1 to 10 wt. %, or 1 to 5 wt. % based on the total weight of the membrane.

In some embodiments, the microporous membrane is a monolayer membrane, a bilayer membrane, a trilayer membrane, or a multilayer membrane. In some preferred embodiments, the microporous membrane is a polyolefin monolayer membrane, a bilayer membrane, a trilayer membrane, or a multilayer membrane, such as a PP and/or PE membrane. In some particular preferred embodiments, the microporous membrane is a polyolefin monolayer membrane, a bilayer membrane, a trilayer membrane, or a multilayer membrane, having at least a PP outer layer or surface having at least one adhesion promoting additive or polymer.

In a bilayer membrane, one or both of the layers of the bilayer membrane may comprise the at least one additive. In a trilayer embodiment, one or both of the outermost layers may comprise the at least one additive, and in some trilayer embodiments, the inner layer alone or the inner layer and one or both of the outermost layers may comprise the at least one additive. In a multilayer membrane, one or both of the outermost layers may comprise the at least one additive. In some multilayer embodiments, at least one inner layer or at least one inner layer and one or both outermost layers may comprise the at least one additive. In some multilayer embodiments, all inner layers or all inner layers and one or both outermost layers may comprise the at least one additive.

In some preferred embodiments, the additive is present in an amount up to 30 wt. %, up to 25 wt. %, up to 20 wt. %, up to 15 wt. %, up to 10 wt. %, or up to 5 wt. % based on the weight of the layer or layers it is present in.

In some preferred embodiments, both outermost layers of the membrane exhibit improved adhesion and contain the at least one additive. In other embodiments, at least one surface exhibits at least one of the following: reduced pin removal force, more controlled pore size, improved wetting with electrolyte, improved ion capture, increased durability or toughness, and combinations thereof compared to a microporous membrane that is made from the at least one polymer, but does not contain any additives. These properties may result from the at least one additive that results in improved adhesion or from another additive. The at least one surface may also exhibit at least one of the foregoing properties in addition to or instead of improved adhesion with a coating, including polyaramid-containing coatings, or metallic surfaces. In some embodiments, one surface of the membrane exhibits improved adhesion with a coating, including polyaramid-containing coatings, or metallic surfaces and another surface of the membrane exhibits one or more of the foregoing properties, e.g., improved durability toughness. In some embodiments, one or both surfaces of the membranes exhibit improved adhesion with coatings, including polyaramid-containing coatings, or metallic surfaces and one or more of the foregoing properties, e.g., improved durability or toughness.

In some embodiments, at least one surface of the membrane exhibits at least reduced pin removal force or at least reduced pin removal force and improved adhesion with coatings, including polyaramid-containing coatings, or metallic surfaces. In such embodiments, the microporous membrane may also comprise at least one additive that comprises at least one lubricating agent that may provide the reduced pin removal force. The lubricating agent may be amphiphilic. The lubricating agent may also be a fatty acid salt. Exemplary fatty acid salts may include lithium stearate, sodium stearate, potassium stearate, and combinations thereof. In some embodiments, the lubricating agent may be a compound comprising one or more siloxy functional groups, including a siloxane or a polysiloxane. In some embodiments, the lubricating agent may be an ultra-high molecular weight polysiloxane.

In some embodiments, at least one surface of the membrane exhibits more controlled pore size or at least more controlled pore size and improved adhesion with coatings, including polyaramid-containing coatings, or metallic surfaces. In such embodiments, the microporous membrane may also comprise at least one additive that comprises a homopolymer, copolymer, or terpolymer having a different molecular weight than the at least one polymer or resin that microporous membrane is made from.

In some embodiments, at least one surface of the membrane exhibits improved wetting with electrolyte or at least improved wetting with electrolyte and improved adhesion with a coating, including a polyaramid-containing coating.

In some embodiments, at least one surface of the membrane exhibits improved ion capture or at least improved ion capture and improved adhesion with a coating, including a polyaramid-containing coating. For example, an ionomer additive may improve ion capture.

In some embodiments, at least one surface or layer of the membrane exhibits increased durability or toughness or at least increased toughness and improved adhesion with a coating, including a polyaramid-containing coating. Increased toughness, in some embodiments, may mean increased tensile strength. In such embodiments, the microporous membrane may also comprise at least one additive that comprises an ionomer resin that may provide the property of increased toughness or increased tensile strength. In some embodiments, the additive comprises, consists of, or consists essentially of an ionomer. An ionomer, as understood by one of ordinary skill in the art is a copolymer containing both ion-containing and non-ionic repeating groups. Sometimes the ion-containing repeating groups may make up less than 25%, less than 20%, or less than 15% of the ionomer. In some embodiments, the ionomer may be a Li-based, Na-based, or Zn-based ionomer. Examples of a commercially available ionomer include Surlyn® sold by DuPont™, Primacor™ available from SK Global Chemical, Eltex® available from Ineos, and Aquavion® available from Solvay.

In some embodiments, the microporous membrane described herein is coated with a polyaramid-containing coating on at least one side thereof. Preferably, the polyaramid-containing coating is coated on the surface or surfaces of the membrane exhibiting improved adhesion to polyaramid-containing coatings. In some embodiments, the polyaramid-containing coating also comprises at least one of an organic filler, an inorganic filler, and combinations thereof. In some embodiments, the microporous membrane described herein is coated with a polymer coating where the polymer coating may comprise, consist of, or consist essentially of a polymer, for example, an acrylic polymer.

In some embodiments, at least one surface of the microporous membrane described herein is in direct contact with a metallic surface. Preferably, the surface of the membrane exhibiting improved adhesion to a metallic surface is in contact with the metallic surface. In some embodiments, both surfaces of the membrane are in direct contact with a metallic surface or one is in contact with a metallic surface and one is in contact with a coating such as a polyaramid-containing coating.

In some embodiments, the at least one surface may be coated, treated, or otherwise modified to even further improve strength. For example, at least one surface may be corona treated or coated with a PE and/or latex coating.

In another aspect, a microporous membrane or membrane layer made from at least one polymer or resin and at least one additive is disclosed. The additive achieves at least one of the following functions: (1) increases adhesion of at least one surface of the microporous membrane with a coating layer; (2) increases adhesion of at least one surface of the microporous membrane with a metallic surface; (3) reduces pin removal on at least one surface of the microporous membrane; (4) increases wettability with electrolyte on at least one surface of the microporous membrane; (5) increases ion capture on at least one surface of the microporous membrane; (6) increases toughness or tensile strength on at least one surface of the microporous membrane; (7) controls pore size on at least one surface of the microporous membrane; (8) reduces static on at least one surface of the microporous membrane; (9) increases puncture strength; and (10) increases ionic transport across the membrane. In some embodiments, 1 additive performs one, two, three, four, five, six, seven, eight, nine, or all ten of these functions. In some embodiments different additives that perform one, two, three, four, five, six, seven, eight, nine, or all ten of these functions are added.

In some embodiments, the additive increases adhesion of at least one surface of the microporous membrane with a coating layer such as a ceramic coating or a polymer coating layer. The coating layer, in some preferred embodiments, is a polyaramid-containing coating layer. In some such embodiments, the additive is a functionalized polymer that increases adhesion of at least one surface of the microporous membrane with a coating layer. Exemplary functionalized polymers include an anhydride modified polyethylene, an anhydride modified polypropylene, and combinations thereof. Specific examples of maleic anhydride modified polyolefins include maleic anhydride modified high-density polyethylene (MA-HDPE), maleic anhydride modified copolymer polypropylene (MA-Co-PP), and maleic anhydride modified homopolymer polypropylene (MA-Homo-PP).

In some embodiments, the additive increases adhesion of at least one surface of the microporous membrane with a metallic surface. In some embodiments, the metallic surface is a metallic electrode. In some such embodiments, the additive is a functionalized polymer that increases adhesion of at least one surface of the microporous membrane with a coating layer. Exemplary functionalized polymers include an anhydride modified polyethylene, an anhydride modified polypropylene, and combinations thereof. Specific examples of maleic anhydride modified polyolefins include maleic anhydride modified high-density polyethylene (MA-HDPE), maleic anhydride modified copolymer polypropylene (MA-Co-PP), and maleic anhydride modified homopolymer polypropylene (MA-Homo-PP).

Amount of the functionalized polymer may range from 1 to 100 wt. % based on the weight of the membrane or based on the weight of the layer that the functionalized polymer is added to.

Functionalization of the functionalized polymer may vary. Functionalization is the amount of functional groups (for example MAH groups) present in a given weight or amount of polymer. Due to this variation in functionalization of functionalized polymers, it is important to consider the amount of functional groups, and not just the amount of functionalized polymer, added to form the microporous membranes. In preferred embodiments, the amount of functional groups is between 0.05 and 5 wt. % based on the total weight of the microporous membrane or based on the total weight of the layer of the membrane in which the functionalized polymer (and thus the functional group) is added. In a monolayer membrane, the amount of functional groups is between 0.05 and 5 wt. % based on the total weight of the microporous membrane or based on the total weight of the layer of the membrane in which the functionalized polymer (and thus the functional group) is added will be the same. In some embodiments, the amount is between 0.1 and 5 wt. %, between 0.2 to 5 wt. %, between 0.5 and 5 wt. %, between 1 and 5 wt. %, between 1.5 and 5 wt. %, between 2 and 5 wt. %, between 2.5 and 5 wt. %, between 3 and 5 wt. %, between 3.5 and 5 wt. %, between 4 and 5 wt. %, or between 4.5 and 5 wt. % based on the total weight of the microporous membrane or based on the total weight of the layer of the membrane in which the functionalized polymer (and thus the functional group) is added.

In some embodiments, the additive reduces pin removal on at least one surface of the microporous membrane. In some such embodiments, the additive comprises a lubricating agent. The lubricating agent or lubricant described herein is not so limited. As understood by one of ordinary skill in the art, a lubricant is a compound that acts to reduce the frictional force between a variety of different surfaces, including the following: polymer:polymer; polymer:metal; polymer; organic material; and polymer:inorganic material. Specific examples of lubricating agents or lubricants as described herein are compounds comprising siloxy functional groups, including siloxanes and polysiloxanes, and fatty acid salts, including metal stearates.

In some embodiments, the additive may be a surface friction altering agent that may increase or decrease the surface friction of at least one surface of the microporous membrane. For example, the additive may be a blocking agent, an anti-blocking agent (silica, diatomaceous earth, talc, calcium carbonate, or combinations thereof), a slip agent or an anti-slip agent.

Compounds comprising two or more, three or more, four or more, five or more, six or more, seven or more, eight or more, nine or more, or ten or more siloxy groups may be used as the lubricant described herein. Siloxanes, as understood by those in the art, are a class of molecules with a backbone of alternating silicon atom (Si) and oxygen (O) atoms, each silicon atom can have a connecting hydrogen (H) or a saturated or unsaturated organic group, e.g., —CH3 or C2H5. Polysiloxanes are a polymerized siloxanes, usually having a higher molecular weight. In some preferred embodiments described herein, the polysiloxanes may be high molecular weight, or even more preferred in some cases, ultra-high molecular weight polysiloxanes. In some embodiments, high and ultra-high molecular weight polysiloxanes may have weight average molecular weights ranging from 500,000 to 1,000,000.

The fatty acid salts described herein are also not so limited and may be any fatty acid salt that acts as a lubricant. The fatty acid of the fatty acid salt may be a fatty acid having between 12 to 22 carbon atoms. For example, the metal fatty acid may be selected from the group consisting of: Lauric acid, myristic acid, palmitic acid, stearic acid, oleic acid, linoleic acid, linolenic acid, palmitoleic acid, behenic acid, erucic acid, and arachidic acid. The metal is not so limited, but in preferred embodiments is an alkaline or alkaline earth metal, such as Li, Be, Na, Mg, K, Ca, Rb, Sr, Cs, Ba, Fr, and Ra. In some preferred embodiments, the metal is Li, Be, Na, Mg, K, or Ca.

In some preferred embodiments, the fatty acid salt is lithium stearate, sodium stearate, lithium oleate, sodium oleate, sodium palmitate, lithium palmitate, potassium stearate, or potassium oleate.

In some preferred embodiments described herein, the lubricant, including the fatty acid salts described herein, has a melting point of 200° C. or above, 210° C. or above, 220° C. or above, 230° C. or above, or 240° C. or above. A fatty acid salt such as lithium stearate (melting point of 220° C.) or sodium stearate (melting point 245 to 255° C.) has such a melting point. A fatty acid salt such as calcium stearate (melting point 155° C.) does not. The inventors of this application have found that calcium stearate is less ideal, from a processing standpoint, than other fatty acid metal salts, e.g., metal stearates, having higher melting points. Particularly, it has been found that calcium stearate could not be added in amounts above 800 ppm without what has been termed a "snowing effect" where wax separates and gets everywhere during a hot extrusion process. Without wishing to be bound by any particular theory, using a fatty acid metal salt with a melting point above the hot extrusion temperatures is believed to solve this "snowing" problem. Fatty acid salts having higher melting points than calcium stearate, particularly those with melting points above 200° C., may be incorporated in amounts above 1% or 1,000 ppm, without "snowing." Amounts of 1% or above have been found to be important for achieving desired properties such as improved wettability and pin removal improvement. In some preferred embodiments, amounts from 1 to 10%, 1 to 9%, 1 to 8%, 1 to 7%, 1 to 6%, 1 to 5%, 1 to 4%, 1 to 3%, or 1 to 2% may be used.

In some embodiments, a PE and/or latex coating may be coated on one time to lower pin removal force.

In some embodiments, the at least one additive increases wettability with electrolyte on at least one surface of the microporous membrane In such embodiments, the additive may be or comprise a functionalized polymers including at least one of an anhydride modified polyethylene, an anhydride modified polypropylene, and combinations thereof as described herein. The additive may, in some embodiments, be or comprise an ionomer.

In some embodiments, the at least one additive increases ion capture on at least one surface of the microporous membrane.

In some embodiments, the at least one additive increases toughness or tensile strength on at least one surface of the microporous membrane.

In some embodiments, the at least one additive controls pore size on at least one surface of the microporous membrane. In some such embodiments, the at least one additive comprises, consists of, or consists essentially of a homopolymer, copolymer, or terpolymer having a different molecular weight that the polymer or resin that the microporous membrane is made from.

In some embodiments, the at least one additive reduces static on at least one surface of the microporous membrane.

In some embodiments, the additive may be at least one selected from acid copolymers (e.g., copolymers of ethylene (E) and methacrylic acid (MAA) or acrylic acid (AA), such as Nucrel™ of DuPont), ionomers (e.g., Surlyn™ of DuPont, Primacor™ available from SK Global Chemical, Eltex® available from Ineos, and Aquavion® available from Solvay), a maleic-anhydride modified PP or PE homopolymer and/or copolymer resin(s), lubricants, and/or other typical additives or fillers, and combinations thereof.

In some embodiments, the microporous membrane is a monolayer, bilayer, trilayer, or multilayer microporous membrane. What is meant by the term "layer" includes a mono-extruded layer having a thickness from 0.1 to 35 microns. As understood by those skilled in the art, a mono-extruded layer is a layer that was extruded by itself, not with any other layers. Also, the layers of a co-extruded bi-layer, tri-layer, or multi-layer membrane are each considered to be a "layer." The number of layers in coextruded bi-layer will be two, the number of layers in a co-extruded tri-layer will be three, and the number of layers in a co-extruded multi-layer film will be two or more, preferably three or more, or four or more. The exact number of layers in a bi-layer, tri-layer, or multi-layer co-extruded film is dictated by the die design and not necessarily the materials that are co-extruded to form the co-extruded film. For example, a co-extruded bi-, tri-, or multi-layer film may be formed using the same material to form each of the two, three, or four or more layers, and these layers will still be considered to be separate layers even though each is made of the same material. The exact number, again, will be dictated by the die design.

A monolayer microporous membrane may consist of a single mono-extruded layer. A bilayer microporous membrane may consist of two co-extruded layers or two mono-extruded layers that were laminated together. A trilayer microporous membrane may consist of three co-extruded layers, three mono-extruded layers that were laminated together, or two co-extruded layers and one mono-extruded layer that were laminated together. A multilayer may consist of, for example, four or more co-extruded layers, two or more co-extruded layers laminated to another two or more co-extruded layers, two or more co-extruded layers laminated together with two other sets of two or more co-extruded layers, or three co-extruded layer laminated to a mono-extruded layer.

In some embodiments, the microporous membrane is made of a polyolefin resin, including polyethylene, polypropylene, and mixtures and combinations thereof. In some embodiments, the microporous membrane is a monolayer membrane made of a polyolefin resin. For example, it may be made of polyethylene, polypropylene, or mixtures thereof. In some preferred embodiments, the monolayer membrane comprises a majority polypropylene. In some embodiments, the microporous membrane is a bilayer membrane wherein one or both layers are made up of polyolefin.

In some preferred embodiments, at least one layer of the bilayer is made up of a majority polypropylene. In some embodiments, the microporous membrane is a trilayer membrane and at least one of the layers is made up of a polyolefin. In some preferred embodiments, at least one or both of the outermost layers of the trilayer comprise a majority polypropylene. In some embodiments the microporous membrane is a multilayer membrane wherein at least one layer is made up of a polyolefin. In some preferred embodiments, at least the outermost layers of the multilayer embodiment comprise a majority polypropylene.

In some embodiments, the at least one additive increases adhesion of at least one surface of the microporous membrane with a coating layer or metallic layer and pin removal is reduced on a different surface of the microporous membrane. In some embodiments, adhesion is increased and pin removal force is reduced by the same additive, and in some embodiments, different additives provide these different properties.

In another aspect, a multilayer microporous membrane comprises at least one additive in one or both of the outermost layers of the membranes is described. The additive achieves at least one of the following functions: (1) increases adhesion of at least one surface of the microporous membrane with a coating layer; (2) increases adhesion of at least one surface of the microporous membrane with a metallic surface; (3) reduces pin removal on at least one surface of the microporous membrane; (4) increases wettability with electrolyte on at least one surface of the microporous membrane; (5) increases ion capture on at least one surface of the microporous membrane; (6) increases toughness or tensile strength on at least one surface of the microporous membrane; (7) controls pore size on at least one surface of the microporous membrane; (8) reduces static on at least one surface of the microporous membrane; (9) increases puncture strength; and (10) increases ionic transport across the membrane. In some embodiments, 1 additive performs one, two, three, four, five, six, seven, eight, nine, or all ten of these functions. In some embodiments different additives that perform one, two, three, four, five, six, seven, eight, nine, or all ten of these functions are added.

In some embodiments where both outermost layers comprise at least one additive, the additives may be the same or different. In some embodiments inner layers of the multilayer membrane may also comprise at least one additive. In some embodiments where the additive may be lost from the membrane over time, e.g., by evaporation or degradation of the additive in the outer or outermost layers, the additive in the inner layer may migrate to the outer layers and replenish the lost additive from the outer or outermost layers.

In some multilayer embodiments, the outermost layers may have a thickness between 01 to 20 microns, 1 to 15 microns, 2 to 10 microns, 3 to 5 microns, 0.1 to 5 microns, between 0.1 and 3 microns, between 0.1 and 2.5 microns, between 0.1 to 2 microns.

The microporous membranes described herein, including the multilayer embodiments, may have a thickness from 1 to 60 microns, from 1 to 50 microns, from 1 to 40 microns, from 1 to 30 microns, from 1 to 25 microns, from 1 to 20 microns, from 1 to 15 microns, from 1 to 10 microns, or from 1 to 5 microns. Sometimes, the membranes may be even thinner than 5 microns or thicker than 30 microns. However, for purposes of use in a lithium ion battery, thinner is generally preferred, particularly 20 microns or less, 15 microns or less, 12 microns or less, or 10 microns or less.

In another aspect, a battery separator comprising any of the monolayer, bilayer, trilayer, or multilayer microporous membranes described herein is described. In some preferred embodiments, the microporous membrane may be coated with a coating comprising a polyaramid. In some even more preferred embodiments, the coating may be a ceramic polyaramid-containing coating that further comprises inorganic particles, organic particles, or combinations thereof.

In another aspect, a secondary lithium ion battery comprising a battery separator as described herein is described.

In another aspect, a composite comprising a battery separator as described herein in direct contact with at least one electrode for a secondary lithium ion battery is described. In some embodiments, the separator may be in direct contact with two electrodes for a secondary lithium ion battery. In other embodiments, the separator may be used in a battery, lithium battery, secondary lithium battery, capacitor, super capacitor, hybrid battery/capacitor, cell, electrochemical cell, system, module, pack, and/or the like.

In another aspect, a vehicle or device comprising the battery separator, secondary lithium ion battery, capacitor, or composite described herein is described.

Also, any porous or microporous membrane described herein may possibly be used in or be a textile, filter, HVAC unit, fuel cell, PEM, humidity control layer, transdermal patch, and/or the like. For example, a textile product may comprise, consist of, or consist essentially of any microporous membrane described herein. In some embodiments, a laminate textile product comprising at least one microporous membrane described herein is described. In some embodiments, the laminate may comprise more than one microporous membrane described herein. In some embodiments, the laminate may comprise one or more microporous membranes described herein and another woven, nonwoven, knit, coating, and/or porous or microporous layer. In some embodiments, the textile or laminate textile products disclosed herein may be used in a garment such as jackets, pants, shirts, hats, socks, underwear, gloves, or shorts. In some embodiments, the textile or laminate textile products disclosed herein may be used to form outdoor gear such as tents, backpacks, or tarps.

In other embodiments, a laminate or composite membrane, material or separator may comprise one or more microporous membranes described herein and another woven, nonwoven, knit, coating, and/or porous or microporous layer.

In some other embodiments, a single membrane or separator or a laminate or composite membrane, material or separator may be embossed, calendered, coated, treated, and/or further processed depending on the desired end use, thickness, design, pattern, etc.

EXAMPLES

If MAH functionalized polymer was added, certain samples were prepared so that the functional group content (MAH content) is between 0.05 to 5.0 wt. % based on the weight of the layer that the functionalized polymer is added to.

Example 1—To form Example 1, polypropylene and 5% maleic anhydride modified high-density polyethylene were extruded (mono-extruded) to form a monolayer film precursor. No solvent was used. The extruded precursor was then stretched to form pores. Data for Example 1 is found in Table 1.

Note that the same polypropylene was used in each Example and Comparative Example. It is the additive (or lack thereof) that was varied.

Example 2(a)—Examples 2(a) was formed in the same manner as Example 1, except that 10% maleic anhydride modified Homo-PP was added instead of 5% maleic anhydride modified HDPE. Data for Example 2(a) is found in Tables 1-4 below. SEMs of Example 2(a) are also shown below. This is the same modified hdaomo-PP as used in Examples 2(b), 4, and 6-13.

Example 2(b)—Example 2(b) is the same as 2(a) except that different stretching conditions were used to, among other things, form the pores. Data for Example 2(b) is found in Tables 1-4 below. This is the same modified homo-PP as used in Examples 2(a), 4, and 6-13.

Example 3—Example 3 is the same as Example 1, except 10% maleic anhydride modified Co-PP was added instead of 5% maleic anhydride modified HDPE. Also, different stretching conditions were used. Data for Example 3 is shown in Tables 1 and 2 below. SEMs of Example 3 are also shown below.

Example 4—Example 4 is the same as Example 1, except that 15% maleic anhydride modified Homo-PP was used instead of 5% maleic anhydride modified HDPE. Data for Example 4 is shown in Tables 2 and 4 below. SEMs of Example 4 are also shown below. This is the same modified homo-PP used in Examples 2(a) and (b), and 6-13.

Example 5—Example 5 is like Example 1, except that 5% styrene-ethylene-propylene-styrene copolymer was used instead of 5% maleic anhydride modified HDPE. Data for Example 5 is shown in Table 3 below.

Example 6—Example 6 is like Example 1, except that 10% maleic anhydride modified homo-PP and 5% styrene-ethylene-propylene-styrene (SEPS) copolymer were added instead of 5% maleic anhydride modified HDPE. Data for Example 6 is shown in Table 3 below. This is the same modified Homo-PP as was used in Examples 2(a), 2(b), 4 and 7-13.

Example 7—Example 7 is like Example 1, except that 10% maleic anhydride modified homo-PP+5% propylene-ethylene elastomer is used instead of 5% maleic anhydride modified HDPE. Data for Example 7 is shown in Table 3 below. This is the same modified homo-pp as used in Examples 2(a), 2(b), 4, 6, and 8-13.

Example 8—Example 8 is like Example 1 except that 20% maleic anhydride modified Homo-PP was used instead of 5% maleic anhydride modified HDPE. Data for Example 8 is found in Table 4 below. This is the same modified homo-PP as used in Examples 2(a), 2(b), 4, 6, 7, and 9-13.

Example 9—Example 9 is like Example 1 except that 25% maleic anhydride modified Homo-PP was used instead of 5% maleic anhydride modified HDPE. Data for Example 9 is found in Table 4 below. This is the same modified homo-PP as used in Examples 2(a), 2(b), 4, 6, 7, 8, and 10-13.

Example 10—Example 9 is like Example 1 except that 30% maleic anhydride modified Homo-PP was used instead of 5% maleic anhydride modified HDPE. This is the same modified homo-PP as used in Examples 2(a), 2(b), 4, 6, 7, 8, 9, and 11-13.

Example 11—Example 9 is like Example 1 except that 35% maleic anhydride modified Homo-PP was used instead of 5% maleic anhydride modified HDPE. This is the same modified homo-PP as used in Examples 2(a), 2(b), 4, 6, 7, 8, 9, 10, and 12-13.

Example 12—Example 9 is like Example 1 except that 40% maleic anhydride modified Homo-PP was used instead of 5% maleic anhydride modified HDPE. This is the same modified homo-PP as used in Examples 2(a), 2(b), 4, 6, 7, 8, 9, 10, 11, and 13.

Example 13—Example 13 is like Example 1, except that 10% maleic anhydride modified homo-PP and 5% styrene-ethylene-butylene-styrene (SEBS) copolymer were added instead of 5% maleic anhydride modified HDPE. This is the same modified homo-PP as used in Examples 2(a), 2(b), 4 and 6-12.

Examples 14-26 Examples 14-26 were made by laminating 2 PP+additive monolayer films with 1 PE monolayer film to form a PP/PE/PP trilayer structure.

Example 27-29—Examples 27-29 were made by co-extruding PP+additive as described above to form a co-extruded trilayer. Also, PE was co-extruded to form a co-extruded trilayer. Then, two PP+additive co-extruded trilayers were laminated with one PE co-extruded trilayer to form a structure as follows (PP/PP/PP)/(PE/PE/PE)/(PP/PP/PP). The additive may be included in one or all of the layers of the PP+additive co-extruded trilayers.

Example 30—Example 30 was prepared like Example 1, except that 5% ionomer was added instead of 5% maleic anhydride modified high-density polyethylene.

Comparative Example 1(a)—Comparative Example 1(a) is like Example 1, except that no additives were added. Also, different stretching conditions were used. Data for Comparative Example 1 (a) is found in Tables 1-3 below. SEMs of Comparative Example 1(a) are also found below.

Comparative Example 1(b)—Comparative Example 1(b) is like Example 1, except that no additives were added. Also, different stretching conditions were used. Data for Comparative Example 1(b) is found in Tables 1 and 3 below.

Comparative Example 1(c)—Comparative Example 1(c) is like Example 1, except that no additives were added. Data for Comparative Example 1 (c) is found in Table 3 below.

Comparative Example 1(d)—Comparative Example 1(d) is like Example 1, except that no additives were added. Also, different stretching conditions were used. Data for Comparative Example 1 (d) is found in Tables 1-3 below. SEMs of Comparative Example 1(a) are also found below.

RESULTS

Figure 7:
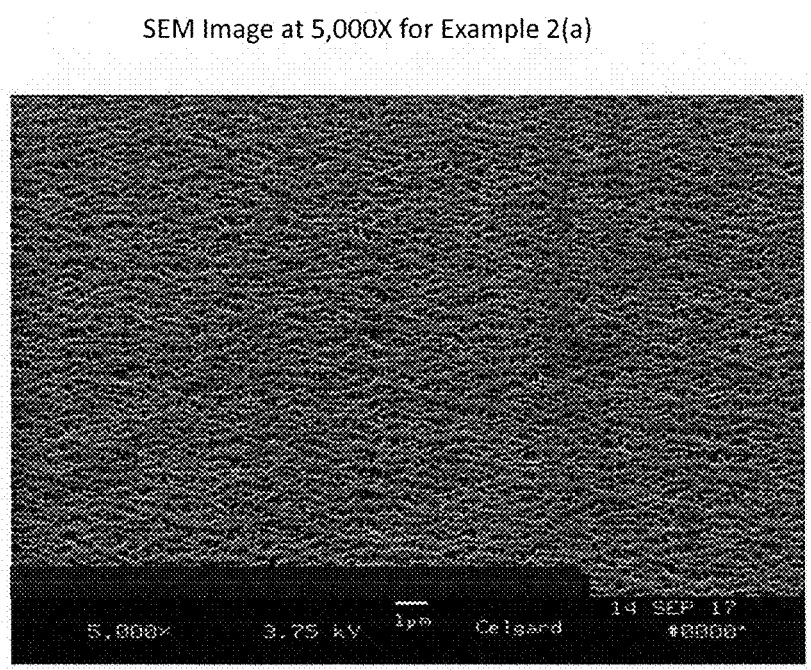
FIG. 7 is an SEM image of an embodiment described herein.
Figure 8:
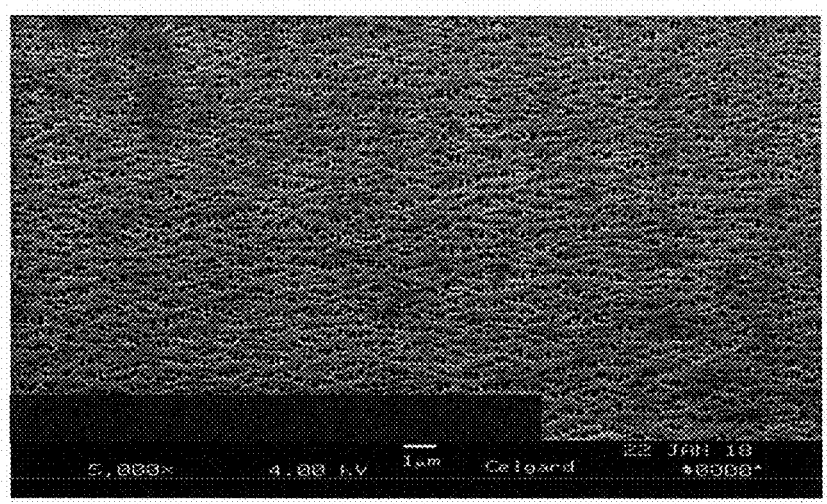
FIG. 8 is an SEM image of an embodiment described herein.
Figure 9:
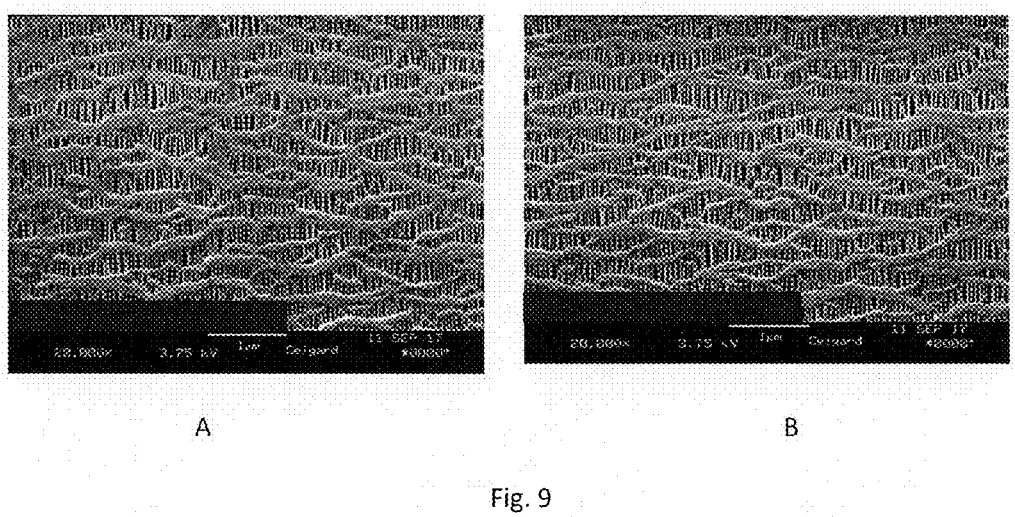
FIGS. 9A and B are SEM images of a comparative example.
Figure 10:
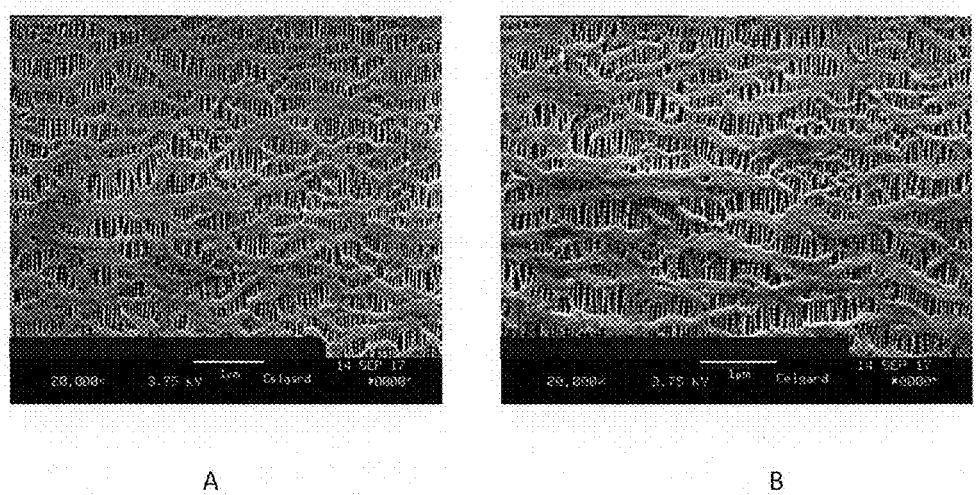
FIGS. 10A and B are SEM images of an embodiment described herein.
Figure 11:
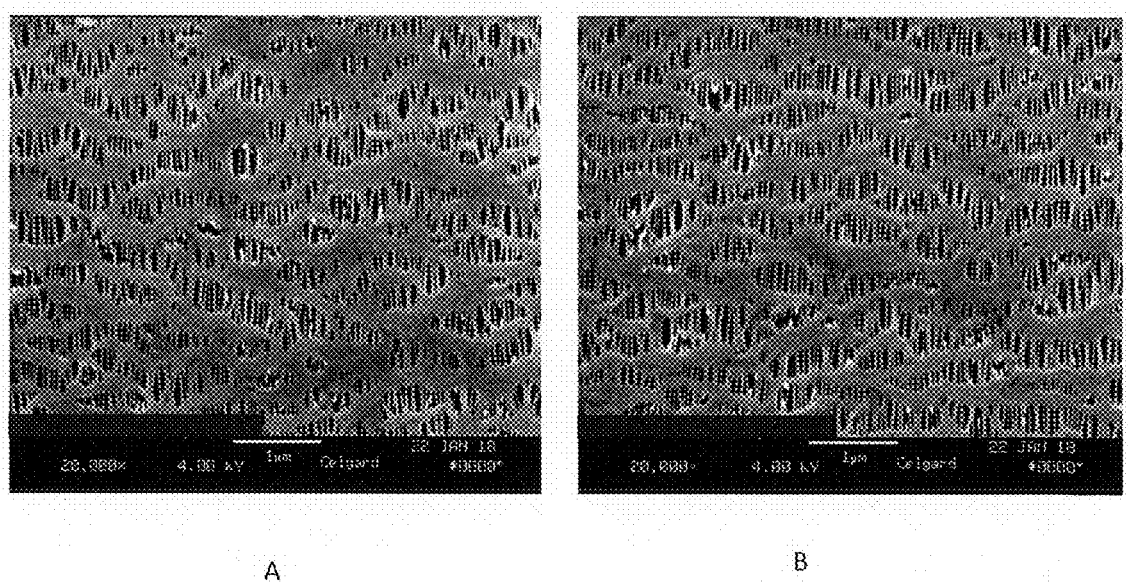
FIGS. 11A and B are SEM images of an embodiment described herein.

See results in Tables 1 to Table 5 (in FIGS. 1-5, respectively).
See SEM Images at 5,000× in FIGS. 6-8.
See SEM Images at 20,000× in FIGS. 9-11.
Pin Removal Force
Pin removal force was measured for Example 8 and Compartive Example 2

Brief Summary of Results

It was found that some benefits of maleic anhydride (MAH) functionalized resins included:
Ability to coat, particularly with polyaramid coatings, polymer coated separator (PCS) coatings, and thin ceramic coatings (nanodispersions less than 1 micron) without treatments such as Corona treatment.
MAH may act as a free radical scavenger, which is important for 5V USABC applications
electrode adhesion increase
static reduction
wettability—including improved wetting speed and contact angle
improved electrode adhesion for
other properties
SEM IMAGES at 20,000× show that even with 15% additive microporous membranes can still be formed using the Celgard® dry process. It is predicted that amounts up to 20%, up to 25%, up to 30% or more will also be Celgard dry processable or capable of forming a microporous membrane like those shown in the SEM images.

Examples 5 and 6, which comprise SEPS elastomers exhibit equal or better puncture than Examples that do not contain SEPS elastomers.

Example 7, which comprises PP elastomer exhibits reduced puncture and lower Gurley.

In accordance with at least selected embodiments, aspects or objects, the present disclosure or invention may address the prior issues, needs or problems, and/or may provide a new or improved microporous monolayer, bilayer, trilayer, or multilayer membrane, separator membrane, separator, or coated separator. The membrane is preferably made up of at least one resin or polymer and at least one additive. The additive may comprise at least one material that improves adhesion of the microporous membrane to a coating, preferably a polyaramid-containing coating, or to a different material such as a metallic surface. Improvements in adhesion are based on comparisons to similar microporous membranes without the at least one additive. In some preferred embodiments, the at least one additive may comprise, consist of, or consist essentially of a functionalized polymer or the combination of a functionalized polymer and an elastomer. In some embodiments, the functional group of the functionalized polymer may be maleic anhydride (MAH). Also disclosed is a battery separator or coated separator comprising the new or improved microporous membrane. The battery separator may comprise the microporous membrane coated with a polyaramid-containing coating. Also disclosed is a new or improved separator, composite, battery, secondary lithium ion battery, and/or vehicle or device comprising the separator, composite, or battery.

Contact Angle Test:
ASTM D5725: Standard Test Method for Surface Wettability and Absorbency of Sheeted Materials Using an Automated Contact Angle Tester.

This test method measures the contact angle of a test liquid in contact with a flat specimen of a film under specified test conditions. Automated equipment is used to observe and measure the angle of a sessile drop on top of a flat specimen.

Various embodiments of the invention have been described in fulfillment of the various objects of the invention. It should be recognized that these embodiments are merely illustrative of the principles of the present invention. Numerous modifications and adaptations will be readily apparent to those skilled in the art without departing from the spirit and scope of this invention.

The present invention may be embodied in other forms without departing from the spirit and the essential attributes thereof, and, accordingly, reference should be made to the appended claims, rather than to the foregoing specification, as indicating the scope of the invention. Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The foregoing written description of structures and methods has been presented for purposes of illustration only. Examples are used to disclose exemplary embodiments, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. For example, the present inventions or embodiments may be especially well suited for dry process membranes or precursors, but other membranes or precursors may likewise be covered and described such as dry process coextrusion, wet process, wet process coextrusion, BNBOPP cast film, BNBOPP cast film coextrusion, cascaded slot die extrusion, laminated versions, coated products, embossed or calendered versions, and/or the like. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The compositions and methods of the appended claims are not limited in scope by the specific compositions and methods described herein. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

As used in the specification and the appended claims, the singular forms "a," "an," and "the" include plural referents unless the context clearly dictates otherwise. Ranges may be expressed herein as from "about" or "approximately" one particular value, and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. "Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. The terms "consisting essentially of" and "consisting of" may be used in place of "comprising" and "including" to provide for more specific embodiments of the invention and are also disclosed. "Exemplary" or "for example" means "an example of" and is not intended to convey an indication of a preferred or ideal embodiment. Similarly, "such as" is not used in a restrictive sense, but for explanatory or exemplary purposes.

Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

Additionally, the invention illustratively disclosed herein suitably may be practiced in the absence of any element which is not specifically disclosed herein.

The invention claimed is:

1. A microporous membrane made from at least one polymer or resin and at least one additive in an amount of from 1 to 50 wt. %,
   wherein at least one surface or layer of the microporous membrane exhibits an adhesion or adhesive strength with a coating comprising a polyaramid, a polymer coated separator (PCS) coating, and/or with a metallic surface such as an electrode that is higher when compared to the adhesion or adhesive strength between a microporous membrane that is made from just the at least one polymer, but does not contain the at least one additive, wherein
   the higher adhesion is exhibited without pre-coating or pre-treating the microporous membrane to increase adhesion, and
   the at least one additive comprises a functional polymer, and wherein the functional polymer is a mixture of maleic anhydride modified polypropylene (MA-PP) and a maleic anhydride modified high density polyethylene (MA-PE);
   wherein, optionally, a coating comprising a polyaramid or a metallic surface is provided on the surface or layer of the microporous membrane; and
   wherein additive achieves at least one of the following functions:
   increases adhesion of at least one surface of the microporous membrane with a coating layer, including a polyaramid containing coating, a ceramic coating, a polymer coating, and the like;
   increases adhesion of at least one surface of the microporous membrane with a metallic surface such as an electrode;
   reduces pin removal on at least one surface of the microporous membrane;
   increases wettability with electrolyte on at least one surface of the microporous membrane;
   increases ion capture on at least one surface of the microporous membrane;
   increases toughness or durability on at least one surface of the microporous membrane;
   controls pore size on at least one surface of the microporous membrane;

reduces static on at least one surface of the microporous membrane;
increases puncture strength; and/or
increases ionic transport across the membrane.

2. The microporous membrane of claim 1, wherein said coating alternatively comprising a polymer coated separator (PCS) coating.

3. The microporous membrane of claim 1, wherein the additive further comprises an elastomer selected from styrene-ethylene-propylene-styrene (SEPS) and styrene-ethylene-butylene-styrene (SEBS).

4. The microporous membrane of claim 1, wherein the additive is present in an amount of 1 to 25 wt. % based on the total weight of the membrane, 1 to 15 wt. % based on the total weight of the membrane, or 1 to 10 wt. % based on the total weight of the membrane.

5. The microporous membrane of claim 1, wherein:
the membrane is a bilayer membrane, and at least one layer of the bilayer membrane comprises the additive;
the membrane is a bilayer membrane and both layers of the bilayer membrane comprise the additive;
the membrane is a bilayer membrane, and at least one layer of the bilayer membrane comprises the additive in an amount up to 50 wt. % based on the weight of the layer, up to 40 wt. % based on the weight of the layer, up to 30 wt. % based on the weight of the layer, up to 25 wt. % based on the weight of the layer, up to 20 wt. % based on the weight of the layer, based on 15 wt. % based on the weight of the layer, up to 10 wt. % based on the weight of the layer, or up to 5 wt. % based on the weight of the layer;
the membrane is a multilayer membrane, and at least one layer of the multilayer membrane comprises the additive;
the membrane is a multilayer membrane, and at least one outermost layer of the multilayer membrane comprises the additive;
the membrane is a multilayer membrane, and at least one layer of the multilayer membrane comprises the additive in an amount up to 50 wt. % based on the weight of the layer, up to 40 wt. % based on the weight of the layer, up to 30 wt. % based on the weight of the layer, up to 25 wt. % based on the weight of the layer, up to 20 wt. % based on the weight of the layer, based on 15 wt. % based on the weight of the layer, up to 10 wt. % based on the weight of the layer, or up to 5 wt. % based on the weight of the layer; or
the membrane is a multilayer membrane, and at least one outermost layer of the multilayer membrane comprises the additive in an amount up to 20 wt. % based on the weight of the layer, up to 15 wt. % based on the weight of the layer, up to 10 wt. % based on the weight of the layer, or up to 5 wt. % based on the weight of the layer.

6. The microporous membrane of claim 1, wherein at least one surface of the microporous membrane exhibits at least one of reduced pin removal force, more controlled pore size, improved wetting with electrolyte, improved ion capture, increased toughness, and combinations thereof compared to a microporous membrane that is made from the at least one polymer, but does not contain any additives.

7. The microporous membrane of claim 6, wherein:
at least one surface of the microporous membrane exhibits reduced pin removal force compared to a microporous membrane that is made from the at least one polymer, but does not contain any additives;
at least one surface of the microporous membrane exhibits reduced pin removal force compared to a microporous membrane that is made from the at least one polymer, but does not contain any additives, and the at least one surface that exhibits reduced pin removal force is not the same as the at least one surface that exhibits improved adhesion;
at least one surface of the microporous membrane exhibits reduced pin removal force compared to a microporous membrane that is made from the at least one polymer, but does not contain any additives, and the microporous membrane comprises the at least one additive comprises at least one lubricating agent;
at least one surface of the microporous membrane exhibits reduced pin removal force compared to a microporous membrane that is made from the at least one polymer, but does not contain any additives, and the microporous membrane comprises the at least one additive comprises at least one lubricating agent, wherein the lubricating agent is amphiphilic;
at least one surface of the microporous membrane exhibits reduced pin removal force compared to a microporous membrane that is made from the at least one polymer, but does not contain any additives, and the microporous membrane comprises the at least one additive comprises at least one lubricating agent, wherein the lubricating agent is a fatty acid salt;
at least one surface of the microporous membrane exhibits reduced pin removal force compared to a microporous membrane that is made from the at least one polymer, but does not contain any additives, and the microporous membrane comprises the at least one additive comprises at least one lubricating agent, wherein the lubricating agent is a fatty acid salt selected from lithium stearate, sodium stearate, potassium stearate, and combinations thereof;
at least one surface of the microporous membrane exhibits reduced pin removal force compared to a microporous membrane that is made from the at least one polymer, but does not contain any additives, and the microporous membrane comprises the at least one additive comprises at least one lubricating agent, wherein the lubricating agent is a compound comprising one or more siloxy functional groups, including a siloxane or polysiloxane;
at least one surface of the microporous membrane exhibits reduced pin removal force compared to a microporous membrane that is made from the at least one polymer, but does not contain any additives, and the microporous membrane comprises the at least one additive comprises at least one lubricating agent, wherein the lubricating agent is an ultra-high molecular weight polysiloxane;
at least one surface of the microporous membrane exhibits more controlled pore size compared to a microporous membrane that is made from the at least one polymer, but does not contain any additives;
at least one surface of the microporous membrane exhibits more controlled pore size compared to a microporous membrane that is made from the at least one polymer, but does not contain any additives, wherein the at least one additive comprises a homopolymer, copolymer, or terpolymer having a different molecular weight than the polymer or resin that microporous membrane is made from;
at least one surface of the microporous membrane exhibits improved wetting with electrolyte compared to a microporous membrane that is made from the at least one polymer, but does not contain any additives;

at least one surface of the microporous membrane exhibits improved ion capture compared to a microporous membrane that is made from the at least one polymer, but does not contain any additives;

at least one surface of the microporous membrane exhibits increased toughness compared to a microporous membrane that is made from the at least one polymer, but does not contain any additives; or at least one surface of the microporous membrane exhibits increased toughness compared to a microporous membrane that is made from the at least one polymer, but does not contain any additives, wherein the at least one additive comprises ionomer resin.

8. The microporous membrane of claim 1, wherein the at least one surface was coated or treated to even further increase adhesive strength by corona treatment or by providing a PE latex coating.

9. The microporous membrane of claim 1, wherein the at least one additive increases adhesion of at least one surface of the microporous membrane with a coating layer, and the coating layer may comprise a polyaramid.

10. The microporous membrane of claim 1, wherein the at least one additive increases adhesion of at least one surface of the microporous membrane with a metallic surface, and wherein:
the metallic surface is made from an electrode material;
the additive further comprises an elastomer; or
the additive further comprises an elastomer selected from styrene-ethylene-propylene-styrene (SEPS) and styrene-ethylene-butylene-styrene (SEBS).

11. The microporous membrane of claim 1, wherein the at least one additive reduces pin removal on at least one surface of the microporous membrane, and wherein:
the at least one additive further comprises a lubricating agent;
the at least one additive further comprises a lubricating agent, and the lubricating agent is amphiphilic;
the at least one additive further comprises a lubricating agent, and the lubricating agent is a fatty acid salt;
the at least one additive further comprises lubricating agent, and the lubricating agent is a fatty salt selected from lithium stearate, sodium stearate, potassium stearate, and combinations thereof;
the at least one additive further comprises a lubricating agent, and the lubricating agent is a compound comprising one or more siloxy functional groups, including a siloxane or polysiloxane; or
the at least one additive further comprises a lubricating agent, and the lubricating agent is an ultra-high molecular weight polysiloxane.

12. The microporous membrane of claim 1, wherein the at least one additive controls pore size on at least one surface of the microporous membrane, and the at least one additive comprises a homopolymer, copolymer, or terpolymer having a different molecular weight than the polymer or resin that microporous membrane is made from.

13. The microporous membrane of claim 1, wherein the at least one additive achieves at least two, at least three, at least four, at least five, at least six, at least seven, at least eight, at least nine, or all ten of the functions.

14. The microporous membrane of claim 1, wherein:
the at least one additive increases adhesion of at least one surface of the microporous membrane with a coating layer and pin removal is reduced on a different surface of the microporous membrane by the same or a different additive; or
the at least one additive achieves at least one of the functions with respect to at least one surface of the microporous membrane and the same or a different additive achieves at least one different function with respect to a different surface of the microporous membrane.

15. The microporous membrane of claim 1, wherein the additive further comprises at least one of an acid copolymer, an ionomer, and a maleic-anhydride modified PE homopolymer and/or copolymer resin.

16. The microporous membrane of claim 1, wherein the coating further comprises polyaramid and at least one of an inorganic filler, an organic filler, or combinations thereof.

17. The microporous membrane of claim 1, wherein the at least one surface exhibiting an adhesive strength with a metallic surface is in direct contact with a metallic surface.

18. The microporous membrane of claim 1, wherein the at least one additive achieves at least three of the functions.

19. The microporous membrane of claim 1, wherein the at least one additive achieves at least four of the functions.

20. The microporous membrane of claim 1, wherein the at least one additive achieves at least five of the functions.

21. The microporous membrane of claim 1, wherein the at least one additive achieves at least six of the functions.

22. The microporous membrane of claim 1, wherein the at least one additive achieves at least seven of the functions.

23. The microporous membrane of claim 1, wherein the at least one additive achieves at least eight of the functions.

24. The microporous membrane of claim 1, wherein the at least one additive achieves at least nine of the functions.

25. The microporous membrane of claim 1, wherein the at least one additive achieves all ten of the functions.

26. The microporous membrane of claim 1, wherein the additive is present in an amount of at least 5% based on the total weight of the membrane.

27. The microporous membrane of claim 1, wherein the additive is present in an amount of at least 10% based on the total weight of the membrane.

28. The microporous membrane of claim 1, wherein the additive is present in an amount of at least 15% based on the total weight of the membrane.

29. The microporous membrane of claim 1, wherein the additive is present in an amount of at least 20% based on the total weight of the membrane.

30. The microporous membrane of claim 1, wherein the additive is present in an amount of at least 25% based on the total weight of the membrane.

\* \* \* \* \*